United States Patent [19]

Masse

[11] Patent Number: 5,457,031
[45] Date of Patent: Oct. 10, 1995

[54] COMPOSTER AND METHOD OF USE

[76] Inventor: Ronald J. Masse, Box 475, Valleyview Alberta T0H 3N0, Canada

[21] Appl. No.: 122,988

[22] Filed: Sep. 20, 1993

[51] Int. Cl.⁶ .................................. C12M 1/10; C12P 1/00
[52] U.S. Cl. .................... 435/41; 435/290.1; 435/290.3; 435/290.4; 71/9; 220/4.28
[58] Field of Search ...................... 435/243, 287, 435/312, 313, 315, 316, 41; 422/184, 209; 366/220, 233; 71/8–10; 220/4.04, 4.05, 4.08, 4.28, 4.33, 484, 666, 676, 677, 693, 908

[56] References Cited

U.S. PATENT DOCUMENTS

| | | | |
|---|---|---|---|
| 1,940,492 | 12/1933 | Gale | 366/233 |
| 3,132,846 | 5/1964 | Siddall | 366/220 |
| 3,439,901 | 4/1969 | McCulloch | 366/233 |
| 4,687,645 | 8/1987 | Harvey | 422/184 |
| 5,152,414 | 10/1992 | Kruger | 71/9 |
| 5,197,801 | 3/1993 | Swisher | 422/209 |
| 5,234,833 | 8/1993 | Artis | 422/184 |

FOREIGN PATENT DOCUMENTS

| | | | |
|---|---|---|---|
| 1222640 | 6/1987 | Canada . | |
| 1260728 | 9/1989 | Canada . | |
| 3431049 | 3/1986 | Germany | 435/287 |
| 3802499 | 12/1988 | Germany | 435/313 |
| 1111988 | 5/1986 | Japan | 435/312 |

*Primary Examiner*—William H. Beisner

[57] ABSTRACT

A composter is taught having a shape which allows the composter to be rolled on the ground to provide mixing. The composter includes a body having an opening and an internal, perforated aeration tube. A rolling frame is provided for stationary rolling of the composter. The composter may be adapted to have a series of perforated tubes for further aeration and the controlled addition of additives such as liquids or granules. A method for producing compost is taught for use with the composter.

19 Claims, 3 Drawing Sheets

5,457,031

COMPOSTER AND METHOD OF USE

FIELD OF THE INVENTION

The present invention is directed to a composter and, in particular, a substantially spherical composter for use in composting waste material.

SUMMARY OF THE INVENTION

Composting is a natural process whereby waste (composting) materials such as leaves, garden waste, kitchen refuse, grass clippings, chipped trees or paper is broken down into humus, a natural soil nutrient.

Previously, composting was accomplished in garden piles requiring much labour and time. The piles required regular mixing and were exposed to the effects of the weather. Often, a full year was required to obtain humus. Mechanical composters have been developed which are stationary containers mounted on tumblers. Mechanical composters offer a controlled environment and easier mixing, however, the composters are often stationary requiring that the composting materials be transported to and from the composter. The mechanical composters are also often awkward to fill and are quite large in size due to the size of the tumbler mechanism.

A composter has been developed which has a shape which allows for rolling of the composter on the ground to provide mixing and easy transport of the composter to a desired location.

SUMMARY OF THE INVENTION

In a broad aspect of the present invention, there is provided a composter comprising:

a hollow body having an exterior and an interior to receive materials for composting and having a shape suitable for allowing the composter to be rolled along a surface;

a sealable opening disposed in the body for allowing the loading and unloading of materials from the body; and, an aeration means to allow the flow of air into the body.

In another broad aspect of the present invention, there is provided a rolling frame sized to receive the composter for stationary rolling of the composter.

In a further broad aspect of the present invention, there is provided, in a composter of a suitable shape to be rolled on a surface, a method for composting waste material comprising:

placing waste material into the composter;

aerating the waste material; and, mixing the waste material periodically by rolling the composter.

BRIEF DESCRIPTION OF THE DRAWINGS

For a better understanding of the present invention reference may be made by way of example to the following diagrammatic drawings, in which.

DETAILED DESCRIPTION OF THE PRESENT INVENTION

Figure 1:
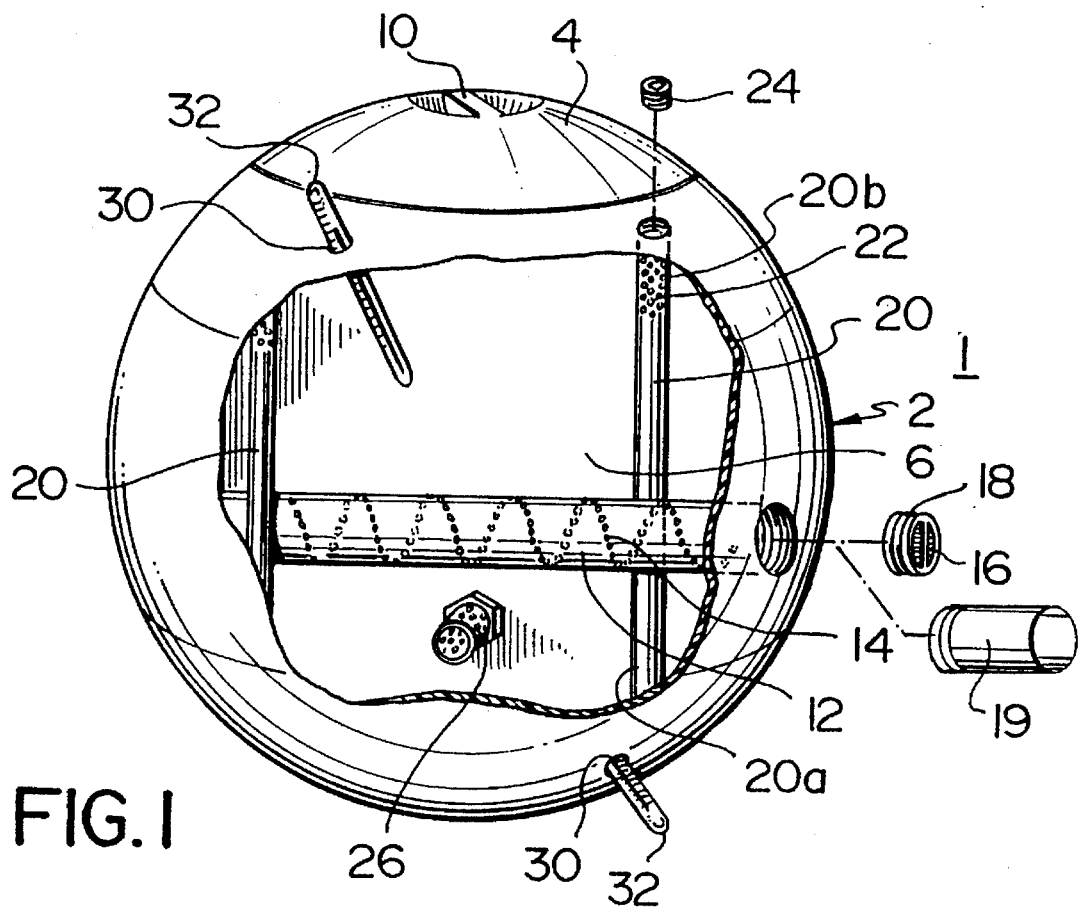
FIG. 1 is a perspective view of the preferred embodiment of the composter of the present invention with a portion of the body cut away to expose the inner tube arrangement.

FIG. 1 illustrates the preferred embodiment of the composter 1 of the present invention which comprises a hollow, substantially spherical body 2 and a sealable closure 4 for allowing access into the interior 6 of the body. For ease of description, the top of the composter will hereinafter be defined by the sealable closure 4.

The body 2 is made of any suitable material for example metal or plastic. Preferably, the body 2 is formed of a durable plastic such as for example polyethylene or recycled polyethylene which provides ease of manufacture through molding. For household use, the body is of a suitable size to contain a household-amount of compost and to provide for ease of handling. Preferably, the body is about 36" in diameter with a wall thickness of ¼". Alternatively, the body may be formed in enlarged sizes for commercial production of compost. Since raised temperature is important to composting process, it is preferred that the composter be of dark exterior colour to allow for the absorption of heat energy from the sun.

The sealable closure 4 is of a suitable size to allow composting materials to be introduced to, and removed from, the body 2. The closure 4 is preferably about 20" in diameter. The closure 4 should seal so as to prevent the accidental release of the material during rolling. The seal may be provided by any suitable means such as external lock fittings, twist lock fittings, or snap fittings. In the preferred embodiment, threads (not shown) are provided on closure 4 and body 2 so that the closure 4 may be screwed into a sealing position with the body 2. Preferably, when in the sealed position, the closure 4 will be flush with the exterior of the body 2 such that a continuous spherical surface is provided. The closure 4 may be fitted with a handle 10 to aid in manipulation of the closure 4. The handle 10 is preferably inset into the closure 4 (as shown) to maintain the spherical shape of the composter. The closure 4 is also preferably formed from polyethylene or recycled polyethylene plastic material as described hereinabove in regards to the body. Alternatively, materials such as fiberglass polypropylene, ABS or PVC may be used in the formation of closure 4.

In the preferred embodiment, an internal aeration tube 12 is provided to allow air flow into the body 2 for the completion of the composting process. The internal aeration tube 12 extends through the interior 6 of the body, opening to the exterior of the body at each end. The aeration tube 12 is disposed with perforations 14 about its radius and along its length. Thus air can flow through the tube 12 and into the composter through the perforations 14. The perforations 14 are of a size adequate to allow the movement of air, while preventing the movement of composting material into the tube, with the exception of very fine particulate. In the preferred embodiment, at least one of the ends, and preferably two ends, of the aeration tube 12 can be sealed by sealing means 16 (one is shown). By use of sealing means 16, the amount of air entering the composter can be controlled as may be required at certain stages of the composting process. The sealing means 16 may be of any suitable type such as snap-on, twist-lock or threaded. Preferably, the sealing means 16 is threaded as shown at 18 and screws into mating threads on the aeration tube 12. In its closed position, the sealing means 16 is flush with the exterior of the body 2. While in the preferred embodiment aeration is provided by aeration tube 12, it is envisioned that aeration may be provided by any aeration means, such as an opening on the body. The opening may be fitted with a screen to prevent the release of the composting material during rolling and further fitted with a sealing means to control the amount of air entering the composter.

The start-up of the composting process may be improved by the addition of heat to the mass of composting material. To provide for the addition of heat, the aeration tube 12 may be adapted to receive a heat gun (not shown). A heat gun is a motorized air blower for producing heated air of a controllable temperature. The heated air is directed into the opening of the aeration tube by means of an adapter. The adapter is a threaded tube which fits into and engages the threads of an end of aeration tube 12 and forms an extension of tube 12 to accept the heat gun. In the preferred embodiment, the adapter is formed of sheet metal.

In the preferred embodiment, the aeration tube 12 is located below the main horizontal axis of the body 2 such that the composting material in the body will surround the tube 12 even if the composter is less than half full. In this way, any heat or air entering the tube 12 will go directly into the mass of the material, where the main composting reaction is known to take place.

The composter 1 of the present invention may, in the preferred embodiment, be adapted to contain a plurality of tubes to further enhance the quality of compost obtained and to provide an improved composting process.

To provide for the controlled addition of additives during the composting process at least one additive tube 20 may be mounted in the body 2. An additive tube 20 extends into the interior of the body 2, opening to the exterior at least at one end and having a plurality of perforations along its length. In the preferred embodiment, the end of the additive tube opposite the opening provides a reservoir 20a for the additive, while the end 20b adjacent the opening has a plurality of perforations 22 to allow the release of additives into the interior of the body 2. A sealing means 24 is provided at the opening, which is similar to sealing means 16 described hereinabove in regards to the aeration tube 12 with the exception that the sealing means 24 must provide a seal which is impervious to liquids. The sealing means may be further designed to extend within the additive tube, when in the closed position, to block the perforations and prevent the release of additives into the composter. In addition, for ease of manufacture and because of the preferred, small radius of the additive tube 20 which is 1¼" in the preferred embodiment, it is not intended that the sealing means 24 be flush with the body 2 since the resulting depression will not substantially affect the rolling of the composter. In the preferred embodiment, the opening of the tube is inset into the body 2, as is the sealing means 24 when in position, as shown. To allow the removal of the sealing means, the sealing means 24 is provided with a square or similar inset so that the sealing means 24 may be grasped.

Figure 2:
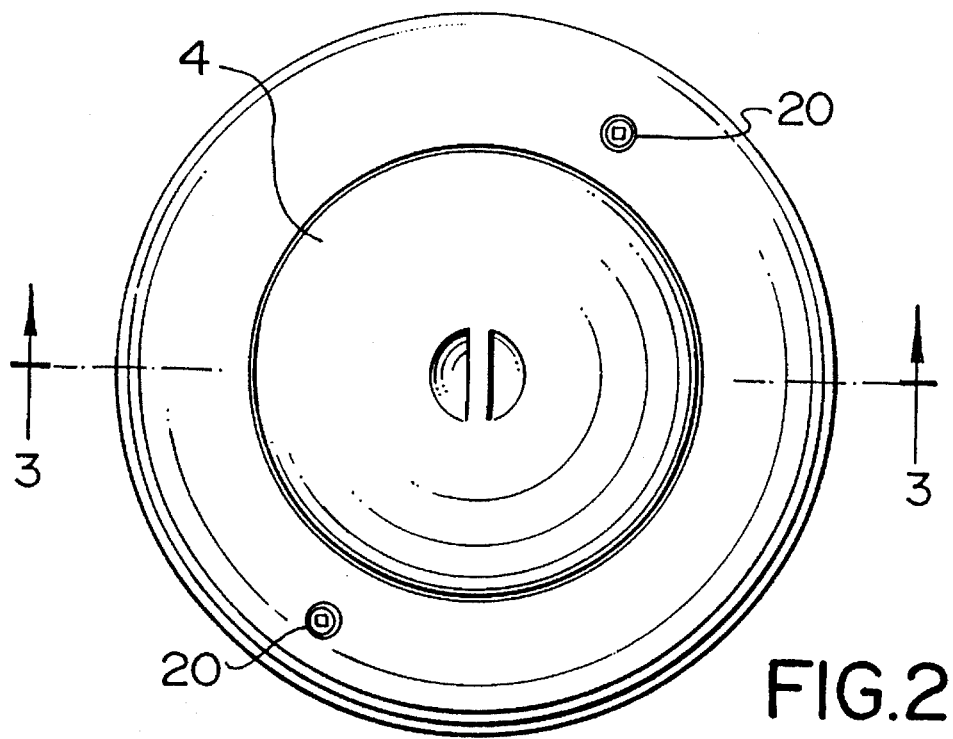
FIG. 2 is a top view of the composter of the present invention.
Figure 3:
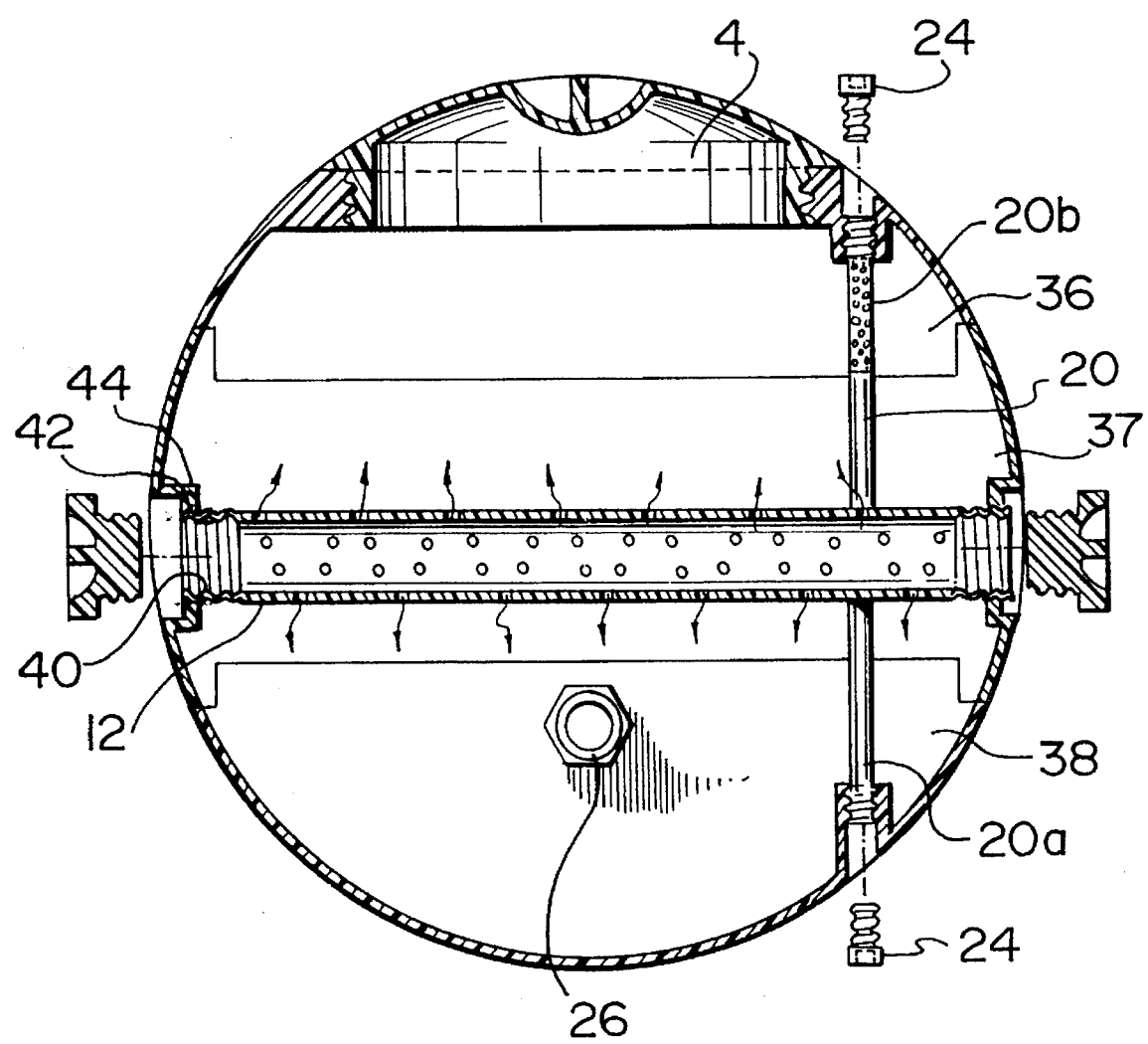
FIG. 3 is a cross section along line 3—3 of FIG. 2.

More than one additive tube 20 may be mounted in the body 2 to allow the simultaneous introduction of more than one additive. While many tubes may be present, it is envisioned that two additive tubes 20, positioned spaced apart and parallel to one another, as shown in FIG. 2, will provide for the addition of various additives and will provide adequate stability to the composter. Different additive tubes can be provided with different size apertures to allow more control over the speed of release of liquids or to allow for release of both granular and liquid additives. The granular additives are released by being dissolved in fluids present in the composter or by the addition of a fluid directly to the tube. If the compost material is dry as at the start of the composting operation, the granular additives will spill through enlarged perforations of suitably adapted additive tubes. As best seen in FIG. 3, additive tubes 20 may extend to a small extent into the body or extend through the interior of the body 2 to open to the exterior of the body 2 at both ends 20a, 20b. Where the additive tube 20 extends through the body 2, both ends 20a, 20b must be designed to receive sealing means 24. It is preferred that the additive tubes 20 extend fully through the body 2 to stabilize the tubes 20 during mixing of the composting material, because they are anchored at both ends.

The design of the additive tubes allows them to act as vents to enhance air circulation within the composter. By leaving the additive unsealed when in the upright position, gasses formed by the composting material will by vented through the perforations of the additive tubes.

Referring back to FIG. 1, a secondary aeration tube 26 can extend across the interior of the body 2. Tube 26 is similar in structure to aeration tube 12 but of reduced diameter. Secondary aeration tube 26 provides additional air flow to the body during critical times in the composting process. Sealing means (not shown) are disposed at each end to allow the tube 26 to be sealed thereby preventing air flow when it is not desired.

The tubes 12, 20, 26 of the composter of the present invention may be formed of any suitable material such as rolled sheet metal or molded plastic. Preferably, the tubes are formed from polyethylene, recycled polyethylene or acrylonitrile-butadiene-styrene (ABS).

A specific arrangement of the tubes within the body is preferred. Aeration tube 12 extends horizontally through the interior of the body 2 slightly offset from the centre axis of the body 2. Secondary aeration tube 26 extends horizontally through the body 2 perpendicular to and below aeration tube 12. In this way, the aeration tubes 12, 26 are positioned such that the composting material will surround the tubes when the composter is in the upright position, (as would be the case just after loading the composting material.) The positioning of the aeration tubes 12, 26 then allows maximum air flow to the mass of the composting material at critical times. Preferably, the additive tubes 20 are placed such that the reservoir ends 20a are opposite closure 4. In this way, it is easy to determine visually from viewing the position of the closure, when the additive materials are located in the reservoirs 20a and when the additives are being released into the composter.

The tubes 12, 20, 26 are positioned to function as baffles within the body to thereby providing additional mixing of the composting material when the composter is rolled.

To simplify the method of producing compost, in the preferred embodiment at least one thermometer port 30 is provided in the body 2. Thermometers 32 can be inserted into the ports 30 and directly into the interior of the composter, while being engaged by the ports, to allow the temperature of the composting material to be easily monitored. The thermometers 32 can be either permanently present in ports 30 or removable when not in use. When the ports 30 are not housing thermometers, sealing means may be provided in the ports. Temperature is an important indicator of the stages of composting. More than one port 30 can be provided (2 are shown) at spaced apart positions on the body so that the temperature of the composting mass and the surrounding air may be monitored regardless of the position of the composting material within the sphere.

The body 2 of the composter of the present invention may be manufactured in a unitary spherical form or, as is preferred, the body may be manufactured in a plurality of sections. FIG. 3 is a cross-sectional view along line 3—3 as shown in the FIG. 2 and shows the preferred sectioning of the composter of the present invention. Preferably, the body 2 is formed in three sections; an upper section 36, a middle section 37, and a lower section 38. In this way, the composter may be disassembled for packaging and shipping and quickly assembled at the site by way of snapping the sections 36, 37, 38 together. Preferably, the sections 36, 37, 38 snap together by means of mating grooves and protrusions spaced about the edge of the sections. In this way, adjoining sections have aligned grooves or protrusions which snap together when force is applied. Further stability is provided in the preferred embodiment by extending and securing the additive tubes across the interior of the composter to join sections 36 and 38.

Aeration tube 12 and secondary aeration tube 26 may be formed integral with the middle 37 and lower 38 body sections, respectively. Additive tube 20 may be formed integral with a section of the body, however, if additive tube 20 extends to open at each end of the exterior of the body 2, there must be a means provided for removing the additive tube 20 from the body 2 at least at one end to provide disassembly of the body sections 36, 37, 38. Preferably, all tubes 12, 20, 26 are removable from the body 2 allowing for ease of manufacture and repair or replacement of the tubes. In the preferred embodiment, as shown in FIG. 3, the ends of all of the tubes are both internally and externally threaded. As illustrated on aeration tube 12, the internal thread 40 accepts the sealing means 16 while the external thread 42 secures a locknut 44 which acts to retain the tube 12 in the body. The tubes may be removed from the body by removing the locknuts and pulling the tubes out of the body.

Figure 4:
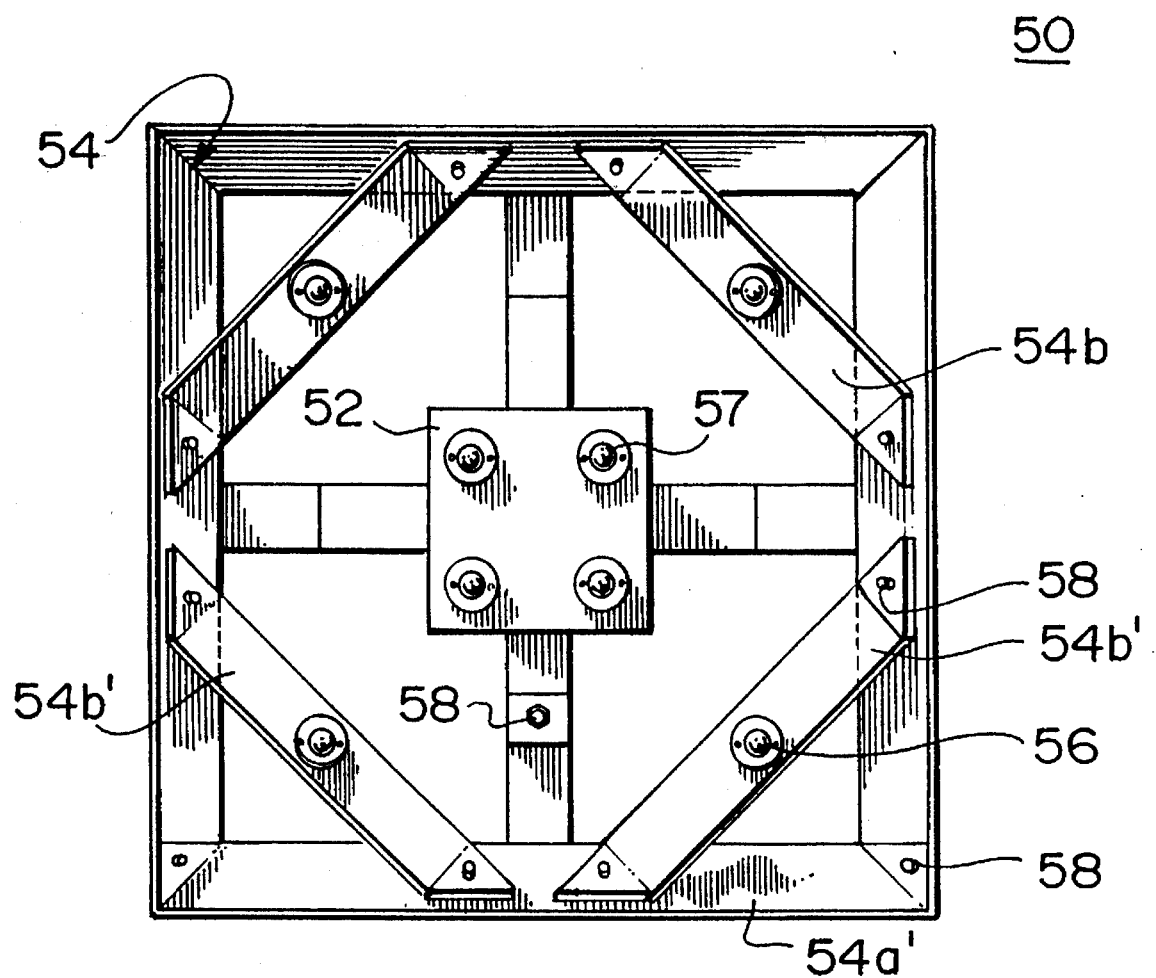
FIG. 4 is a top view of the rolling frame according to the present invention for use with the composter of FIG. 1; and, FIG. 5 is a top view of the rolling frame as shown in FIG. 4.
Figure 5:
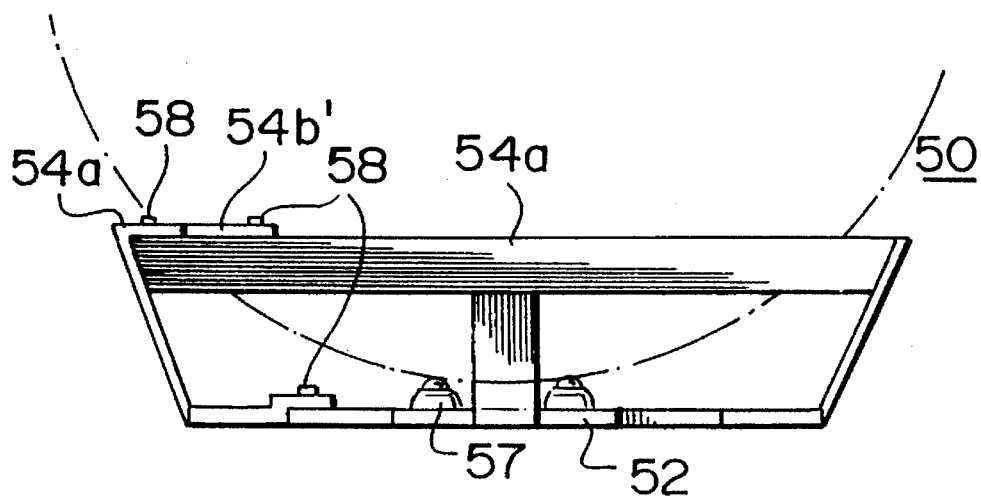

To provide adequate mixing where rolling the composter is not reasonable, as in the case of disabled users or use in is limited spaces, a rolling frame 50 is provided. Referring to FIGS. 4 and 5, the rolling frame 50 comprises a base plate 52 and a support frame 54 about which a plurality of bearing fixtures 56 are mounted. The support frame 54 is firmly attached to the base plate 52 and is sized to receive the spherical composter (not shown). In the preferred embodiment, the support frame 54 is formed of a square frame 54a with corner struts 54b extending from the sides of the square frame 54a. Together the corner struts 54b and the square frame 54a form a central octagonal frame. Bearing fixtures 56 such as a ball bearing fixture are mounted in spaced apart relation on central octagonal frame. In the preferred embodiment, four bearings are spaced apart on the frame and four additional bearings 57 are positioned on the base plate 52 to engage the bottom of the composter. The number of bearings 56 employed in the rolling frame and their respective positioning need only be adequate to allow the free rolling of the composter within the frame. While it will be appreciated that any reasonable number of ball bearing fixtures 56 (in excess of 2) will work, it has been found that the specified arrangement offers optimum results without overly complicating the rolling frame. The composter can be placed in the support frame by lifting it onto the bearings of the frame. In the preferred embodiment, a side 54a' of the frame and corner struts 54b' are removable from the frame allowing the composter to be rolled into the centre of the frame through the open side. When the composter is in place in the frame, the side 54a' and corner struts 54b' are replaced. Thus the composter can be located on the bearings without lifting. The side 54a' and corner struts 54b' may be connected to the frame by any removable locking means such as a set of lock pins 58. When placed in the frame 54, the composter rides on the bearings 57 and may be rotated by simple hand control. In the preferred embodiment, to receive a 36" diameter composter, a rolling frame is provided having a height of about 5" and a internal diameter (within the octagonal frame) of about 29".

The spherical shape of the composter provides that material may be introduced to the body and the body may be rolled about on the ground to mix the material. Thus the composter allows for proper and efficient composting with a minimum amount of manual effort. While a spherical shape is preferred for the composter it is to be understood that any shape of composter which can be rolled is suitable. The composter of the present invention may be ovoid, cylindrical or barrel-shaped. A spherical composter is preferred because it is more easily rolled in all directions and provides more thorough mixing of the composting material.

To obtain compost from the composter of the present invention, composting material is loaded into the assembled composter 1 through closure 4 until the body is preferably substantially full. The material is preferably in a shredded state and is most preferably in a 30:1 carbon to nitrogen ratio. For example, one part of carbon-based materials such as dry leaves, having a 60:1 ratio, can be mixed with three parts of green grass, having a 20:1 ratio, to obtain a final carbon to nitrogen ratio of approximately 30:1. Preferably, water is added to an additive tube 20 while a suitable start-up additive such as fertilizer or micro organism solution is added to a second additive tube 20. Closure 4 is sealed as are tubes 20, 26. A heat gun is mounted onto one end of aeration tube 12 and the opposite end is sealed. Heated air is forced into the composting material by the use of the heat gun while the temperature is monitored through a thermometer port 30. Once the desired temperature (eg. 140° F.) is reached, the heating is discontinued and aeration tube 12 is completely unsealed to allow air flow. After several days the sealing means are removed from secondary tube 26 to allow increased air flow. When addition of additives is desired, the composter is rolled such that the additive will move by gravity to the perforated end 20b of the additive tube 20 and thereafter through the perforations 22, into the body of the composter and into the composting material. After a suitable period of time, the composter is rolled over and the additive moves back down into the reservoir 20a. The composter is rolled several turns at approximately 2 day intervals to mix the composting material. The temperature may reach about 160° F. during the peak composting stage. When the temperature decreases to about 100° F., the composting process is deemed to be finished and the composted material may be unloaded to the garden.

It will be apparent that many other changes may be made to the illustrative embodiments, while falling within the scope of the invention and it is intended that all such changes be covered by the claims appended hereto.

I claim:

1. A composter comprising:
 a hollow body having an exterior and an interior to receive materials for composting and having a spherical shape for allowing the composter to be rolled along a surface;
 a sealable opening disposed in the body for allowing materials to be loaded and unloaded from the body;
 an aeration means to allow a flow of air into the body comprising an internal aeration tube perforated along its length, extending through the hollow body and open to the exterior of the body at its ends; and at least one additive tube being perforated to permit an additive to leak from the additive tube into the body, wherein the additive tube is sealed at a first end to contain the additive and perforated adjacent a second end, and wherein the additive tube is positioned within the body of the composter such that, when the composter is rolled to a first position, the additive will remain in the first end and, when the composter is rolled to a second position, the additive will move to the second end to leak into the body.

2. The composter of claim 1 additionally comprising sealing means to seal the internal aeration tube at at least one end thereof.

3. The composter of claim 2 further comprising an adapter, to engage an end of the internal aeration tube and direct a flow of air into the internal aeration tube.

4. The composter of claim 2 wherein the sealing means is formed such that, when the sealing means is disposed to seal the internal aeration tube, the sealing means maintains the spherical shape of the body.

5. The composter of claim 1 wherein the composter further comprises at least one thermometer port sized to allow the insertion of a thermometer therethrough into the interior of the body.

6. The composter of claim 1 wherein the composter further comprises a secondary perforated aeration tube extending through the hollow body perpendicular to the internal aeration tube.

7. The composter of claim 6 wherein the secondary perforated aeration tube and the internal aeration tube are disposed in the body and formed at their ends such that the spherical shape of the body is maintained.

8. The composter of claim 1 wherein the body is formed of a plurality of sections, the sections being removable each from the other to dismantle the body.

9. A composter apparatus comprising:

a composter as defined in claim 1; and, a rolling frame adapted to receive the composter for stationary rolling of the composter.

10. The composter apparatus of claims 9 wherein the rolling frame comprises a base and a support frame mounted on the base, the support frame being sized to receive the composter and a plurality of bearings disposed on the support frame and the base to allow the rotation of the composter on the rolling frame.

11. A method for composting waste material in a composter as defined in claim 1 comprising:

placing waste material into the composter through said sealable opening;

aerating the waste material with said aeration means; and, mixing the waste material periodically by rolling the composter and introducing additive to the waste material by causing said at least one additive tube to move between said first position and said second position.

12. The method of claim 11 wherein the additive is a liquid or granular additive.

13. The method of claim 11 wherein the waste material is heated through said aeration means after placing the waste material into the composter.

14. The composter of claim 1 wherein the additive tube is disposed in the body and formed at its ends such that the spherical shape of the body is maintained.

15. A composter comprising:

a hollow body having an exterior and an interior to receive materials for composting and having a shape suitable for allowing the composter to be rolled along a surface;

a sealable opening disposed in the body for allowing materials to be loaded and unloaded from the body;

an aeration means to allow a flow of air into the body; and, at least one additive tube being perforated to permit an additive to leak from the additive tube into the body wherein the additive tube is sealed at a first end to contain the additive and perforated adjacent a second end; and, wherein the additive tube is positioned within the body of the composter such that, when the composter is rolled to a first position, the additive will remain in the first end and, when the composter is rolled to a second position, the additive will move to the second end to leak into the body.

16. A composter apparatus comprising:

a composter as defined in claim 15; and, a rolling frame adapted to receive the composter for stationary rolling of the composter.

17. The composter apparatus of claim 16 wherein the rolling frame comprises a base and a support frame mounted on the base, the support frame being sized to receive the composter and a plurality of bearings disposed on the support frame and the base to allow the rotation of the composter on the rolling frame.

18. The composter of claim 15 wherein the body is formed of a plurality of sections, the sections being removable each from the other to dismantle the body.

19. A method for composting waste material in a composter as defined in claim 15 comprising:

placing waste material into the composter through said sealable opening;

aerating the waste material with said aeration means; and, mixing the waste material periodically by rolling the composter and introducing additive to the waste material by causing said at least one additive tube to move between said first position and said second position.

* * * * *